United States Patent
Calpe Maravilla et al.

(10) Patent No.: US 9,927,680 B2
(45) Date of Patent: Mar. 27, 2018

(54) METHOD OF CONTROLLING A MOTOR DRIVEN SYSTEM, APPARATUS FOR CONTROLLING A MOTOR DRIVEN SYSTEM AND A MOTOR DRIVEN SYSTEM CONTROLLED IN ACCORDANCE WITH THE DISCLOSED METHOD

(71) Applicant: ANALOG DEVICES GLOBAL, Hamilton (BM)

(72) Inventors: Javier Calpe Maravilla, Algemesi (ES); Eoin E. English, Pallasgreen (IE); Rafael Mahiques, Xativa (ES); Jose Carlos Canada, Aragon (ES); Maria Jose Martinez, Valencia (ES)

(73) Assignee: ANALOG DEVICES GLOBAL, Hamilton (BM)

( * ) Notice: Subject to any disclaimer, the term of this patent is extended or adjusted under 35 U.S.C. 154(b) by 48 days.

(21) Appl. No.: 14/821,395

(22) Filed: Aug. 7, 2015

(65) Prior Publication Data

US 2017/0041552 A1    Feb. 9, 2017

(51) Int. Cl.
*G03B 3/10*    (2006.01)

(52) U.S. Cl.
CPC ........ *G03B 3/10* (2013.01); *G03B 2205/0007* (2013.01); *G03B 2205/0053* (2013.01)

(58) Field of Classification Search
CPC .. H04N 5/23296; H04N 5/23245; G03B 3/10; G03B 13/00; G03B 3/34; G03B 13/36
See application file for complete search history.

(56) References Cited

U.S. PATENT DOCUMENTS

| | | | |
|---|---|---|---|
| 8,228,017 B2 | 7/2012 | Lyden et al. | |
| 8,299,744 B2 | 10/2012 | Lyden et al. | |
| 8,766,565 B2 | 7/2014 | Lyden et al. | |
| 2008/0130134 A1* | 6/2008 | Ishida | H04N 5/2254 359/698 |
| 2010/0201300 A1* | 8/2010 | Lyden | G05B 5/01 318/561 |
| 2012/0161687 A1* | 6/2012 | Arai | H02P 25/034 318/619 |
| 2015/0349690 A1* | 12/2015 | Chang | H02P 25/034 318/135 |
| 2015/0370031 A1* | 12/2015 | Tikkanen | G02B 7/023 359/824 |

* cited by examiner

*Primary Examiner* — Luong T Nguyen
(74) *Attorney, Agent, or Firm* — Patent Capital Group

(57) ABSTRACT

Actuators are used to move a variety of objects to desired positions. It is generally desirable that they can do this quickly without exhibiting overshoot or ringing. Some actuators are required to respond very quickly and examples of these are voice coil drivers used to move lenses in autofocus cameras provided in everyday devices such as smart phones and tablets. A rapid two step controller scheme had already been disclosed by Analog Devices Inc. While the scheme works well, it can only be used reliably if the resonant frequency of the actuator is known to within 2 or 3%. The inventors have discovered that the resonant frequency of an actuator unexpectedly changes as a function of position. This disclosure provides ways of modifying the control scheme to cope with changes in resonant frequency.

13 Claims, 16 Drawing Sheets

METHOD OF CONTROLLING A MOTOR DRIVEN SYSTEM, APPARATUS FOR CONTROLLING A MOTOR DRIVEN SYSTEM AND A MOTOR DRIVEN SYSTEM CONTROLLED IN ACCORDANCE WITH THE DISCLOSED METHOD

FIELD

The present disclosure relates to methods of and apparatus for controlling motor driven systems. In this context a motor driven system relates to an actuator intended to move a mechanical object from a first position to a second position, with the intention of holding it at the second position for a period of time. Such motor driven systems can be found across a wide variety of devices with applications ranging from consumer devices, such as autofocus cameras (which includes video cameras, hand-held cameras, and cameras included in tablets and smart phones) to disc drives and to industrial robots.

BACKGROUND

It is known that autofocus cameras can achieve their autofocusing by moving a lens with respect to an image sensor. In older camera designs, the lenses were typically held in a carrier such that rotation of an external body would cause translation of the lens with respect to the image sensor. Such cameras typically use a stepper motor. In smaller cameras as typically found in smart phones and tablets the lens is positioned using a voice coil motor.

It is generally desirable for motor driven mechanical systems to move quickly between an initial position (a first position) and a demanded position (a second position or a final position). However, because such mechanical systems can be approximated by moving a mass via a coupling member (which behaves like a spring) then phenomena such as overshoot and ringing can occur in such systems.

The present disclosure relates to methods for reducing overshoot and ring time phenomena, and apparatus implementing these methods.

SUMMARY

In the first aspect of this disclosure there is provided a method of driving a motor driven mechanical system from a first position to a second position. A method comprises calculating a change in a drive signal value to move the mechanical system from the first position to the second position. The calculated change is then divided into a plurality of steps so as to form at least a first drive signal value and a second drive signal value. The substantially stepped drive signals are then applied to the motor of the motor driven mechanical system. The stepped drive signal is then periodically updated such that transitions between the steps occur every $t_u$ seconds where $t_u$ is a variable.

Preferably $t_u$ is approximately $\frac{1}{2}F_R$ where $F_R$ is the resonant frequency of the mechanical system at the second position. The inventors realized that, contrary to the prevailing expectations of workers in this field, the resonant frequency of a mechanically driven system may vary as a function of actuator position. This is particularly prevalent with voice coil motor lens drivers. The value of $t_u$ may also be a function of other parameters such as temperature and device orientation.

The value of $t_u$ may be learnt and stored during a calibration step. The voice motor system is often associated with a driver circuit which accepts a digital code C. Where the circuit is expected to operate in an open loop there is an assumed, correlation between the code C and the position that the voice coil (or other similar actuator) will move to as a result of the driver circuit outputting a current in response to the code C. Thus a relationship can be formed, and the value of $t_u$ can be stored as a function of the code C, and represented as $t_u(c)$. However, the inventors have shown that the displacement of the voice motor system in response to a digital code (which includes a code change) can be affected by the orientation of the mechanical system and/or acceleration of the system as a whole. Thus in a refinement of an embodiment of this disclosure, orientation dependent corrections may also be desirable.

In a second aspect of this disclosure there is provided a controller for a motor driven mechanical system, the controller arranged to implement the method of the first aspect of this disclosure.

The method may be encoded as a program to be executed on a programmable data processor. Alternatively application specific hardware may be used to implement the controller, or the controller may comprise a mixture of application specific hardware and a software element.

BRIEF DESCRIPTION OF THE DRAWINGS

Embodiments of the present disclosure will be described, by way of non-limiting example only, with reference to the accompanying drawings, in which.

DESCRIPTION OF SOME EMBODIMENTS OF THE DISCLOSURE

Figure 1:
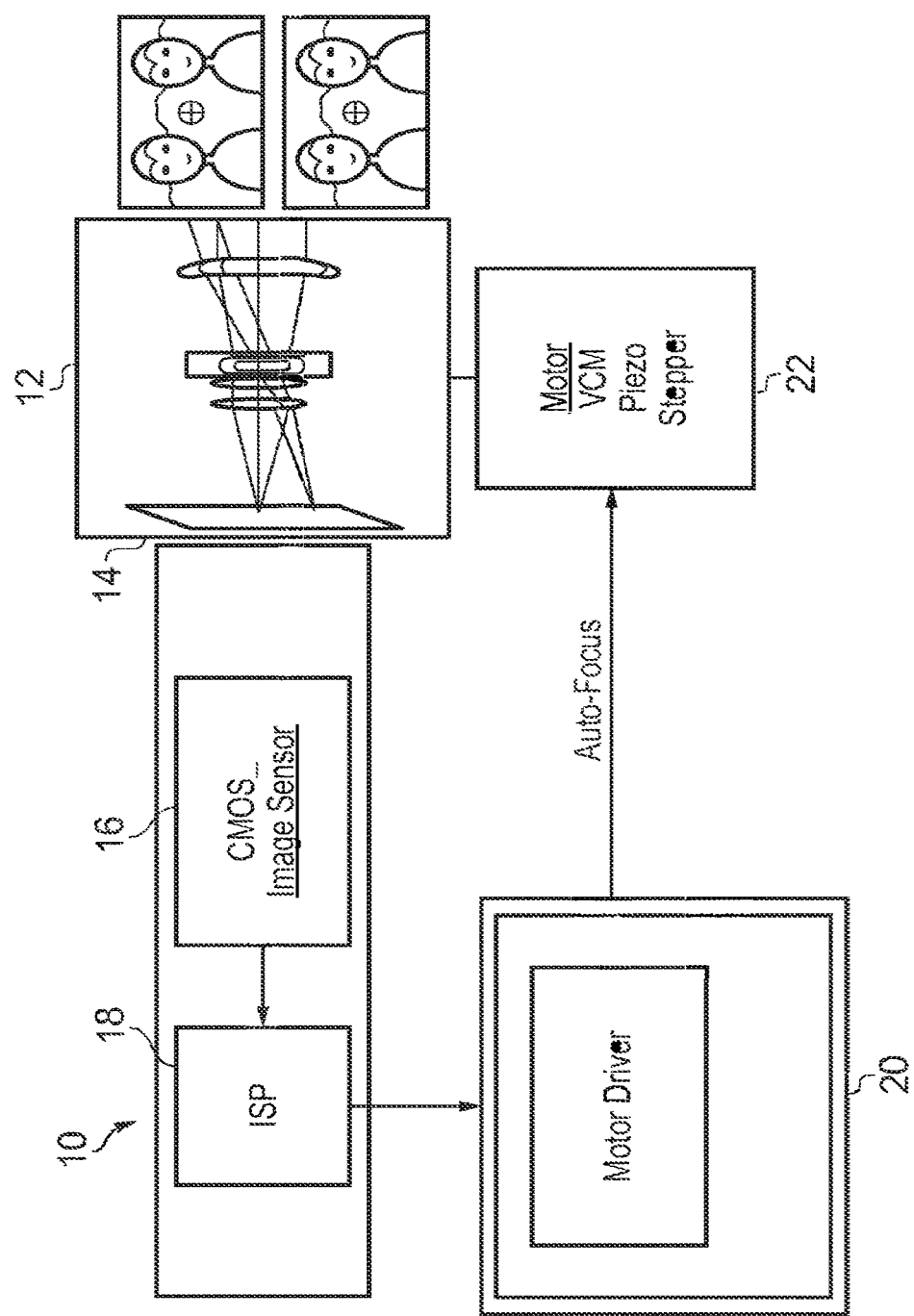
FIG. 1 schematically illustrates components within a camera having automatic focus control.

FIG. 1 schematically illustrates an autofocus camera. An autofocus camera, generally designated 10 comprises a lens or lens assembly 12 which serves to focus incoming light onto an image plane 14 of an image sensor 16. The image sensor 16 digitizes the image and provides data to an image processor 18 which is arranged to implement a known autofocus algorithm. The image processor 18 can then provide a lens position demand signal to a motor driver 20 which generates a current which is supplied to a motor, such as a voice coil motor 22 in order to translate the lens 12 with respect to the image plane 14. Thus it becomes possible for the camera to automatically focus on objects within a scene, and to select distant objects or nearer objects depending parameters such as face detection algorithms or user settings indicating specific modes of operation. Typically in such a voice coil motor, VCM, systems the lens is not indefinitely movable but instead has its range of motion divided into a predetermined number of addressable locations according to the number of a digital code word which is generally used to provide one of a plurality of individual current values to the VCM.

Figure 2:
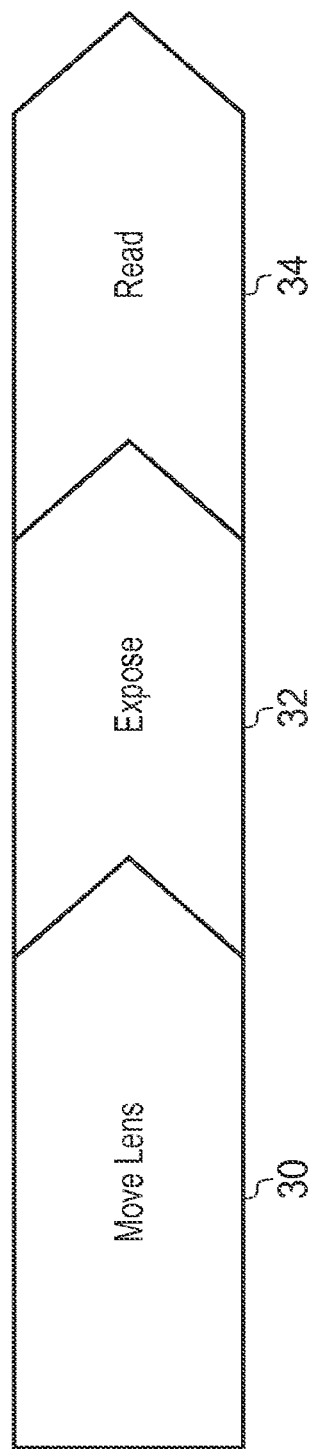
FIG. 2 schematically illustrates the processes performed in the camera of FIG. 1 during a single exposure operation (taking a still photograph)

Typically, when a user wishes to take a photograph, they raise the camera to frame the scene and then press a button to instruct the camera to take a photograph. In response to the instruction the camera may have to perform the steps of moving the lens to a correct position in order to achieve a focus on a desired object, to expose the photo detector array in order that it can capture an image, and then to read the image values from the photo detector array into memory or an image processor. These steps are sequentially illustrated in FIG. 2 as steps 30, 32 and 34, respectively. In the context of "stills" photography only steps 30 and 32 are time critical with the first step, step 30, being the step which most noticeably contributes to "shutter lag" being a time difference between when a user expects to take a photograph and when the photograph is actually captured. Step 30 may include several autofocus steps.

Figure 3:
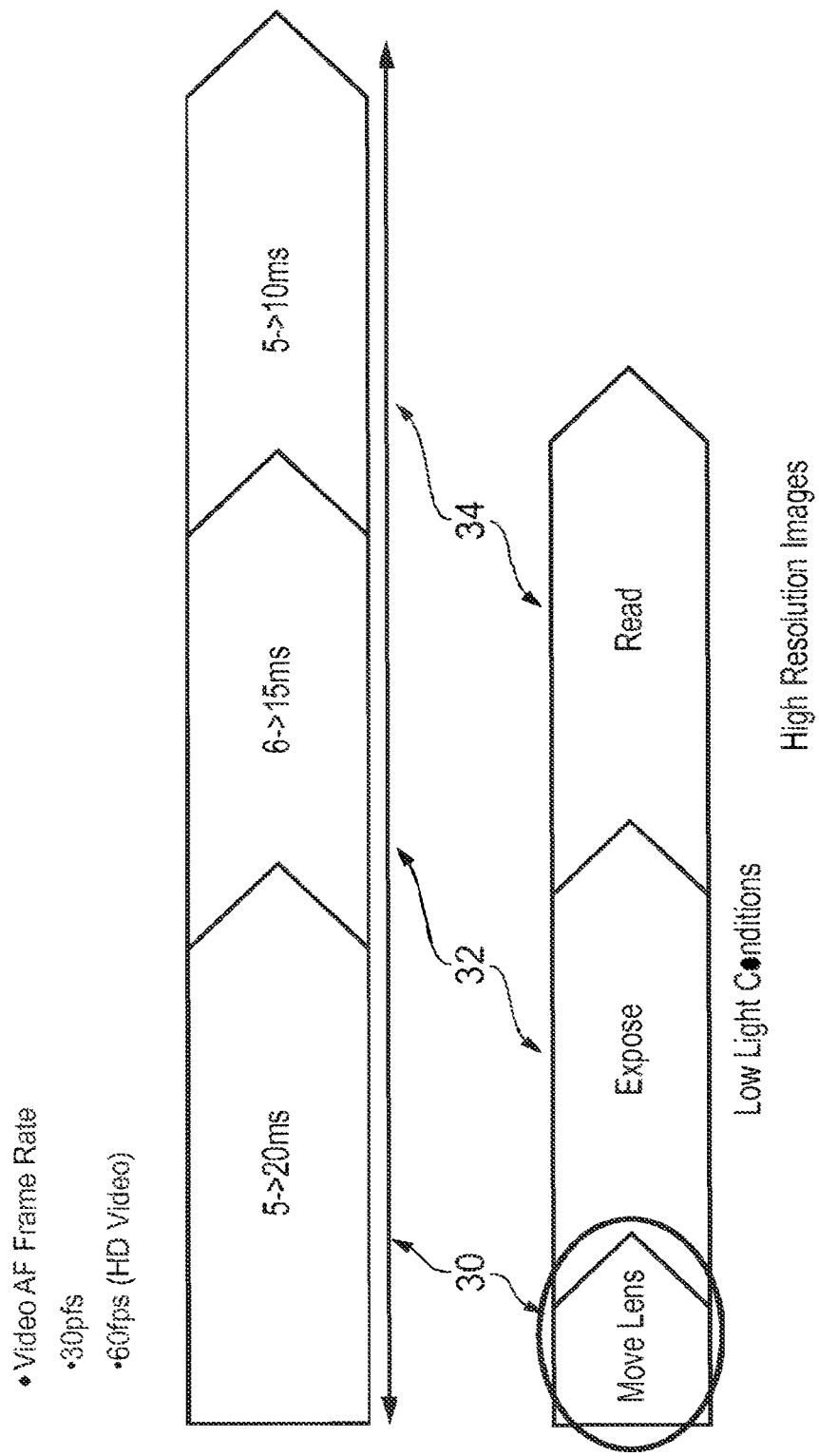
FIG. 3 schematically illustrates the timings available for an autofocus camera operating in video mode.

The camera of FIG. 1 can also typically be used for video capture, whilst still implementing an autofocus function. Standard video is generally captured at 30 frames per second, giving a period of 33 milliseconds in which to complete the focus 30, expose 32 and read 34 operations. High definition video is often captured at 60 frames per second thereby shortening the time frame to around 16.6 milliseconds in order to complete the move lens/focus, expose and read operations. As shown in FIG. 3, and depending on equipment specifications anywhere between 5 and 20 milliseconds may be allowed to move the lens, between 6 and 15 milliseconds, to capture the image, and 5 to 10 milliseconds to read it out, although each of these combined cycles must be completed within the allotted frame time.

In low light conditions it may be necessary to increase the exposure time of the image sensor in order to achieve an appropriate image quality. Given that the read time is fixed, then an increase in exposure time comes at the expense of a reduced time in which to move the lens as part of the autofocus operation. It therefore becomes imperative that the lens can be moved by the voice coil motor quickly and accurately, without exhibiting excessive overshoot or resonance.

It would be possible for the camera manufacturer or voice coil motor manufacturer to include damping in the voice coil motor and lens combination in order to ensure that it was critically damped or nearly critically damped. However such steps would be largely incompatible with mass scale manufacture and would greatly increase the cost of the voice coil motor and lens combination, and may also consume additional power to overcome the damping or loss of speed.

Cameras may have more than one voice coil motor or other mechanical actuator. Such additional actuators may be included as part of an image stabilization system. The teachings of this disclosure can also be applied to image stabilization systems, and indeed to many actuator systems beyond the context of autofocus cameras.

Figure 4:
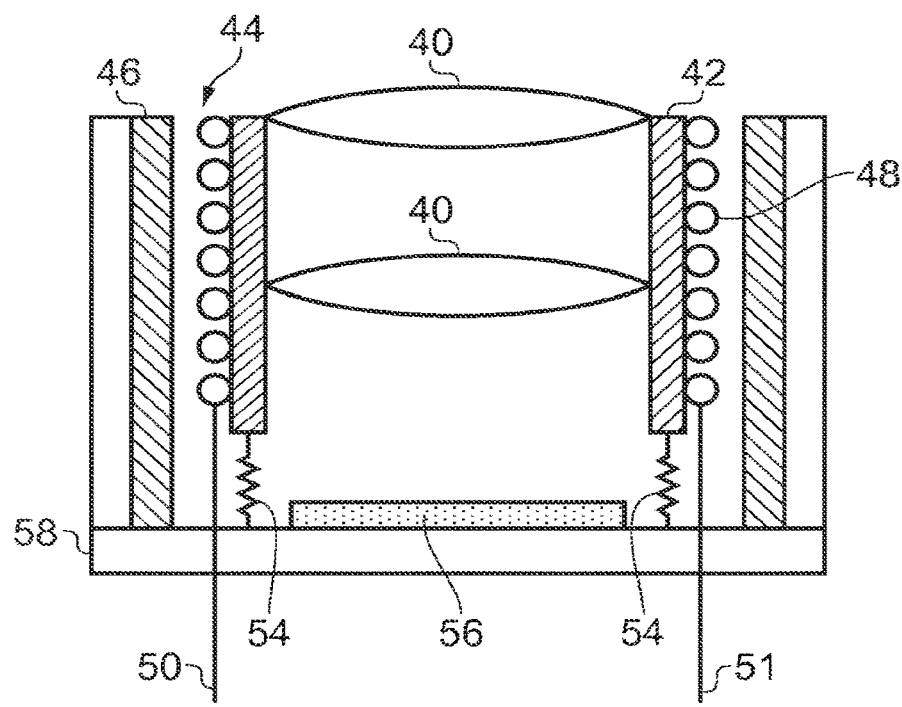
FIG. 4 schematically illustrates the components within a voice coil motor.

By way of completeness, FIG. 4 schematically shows a voice coil motor lens and image sensor combination.

A lens or lens assembly 40 is supported at the center of a carrier 42 which forms a voice coil bobbin which extends into a cooperating recess 44 inside a magnetic yoke 46. The carrier/voice coil bobbin also carries within it or on it a coil 48, the voice coil, which can be energized by way of conductors 50 and 51 and/or an integrated voice coil driver circuit. The lens carrier 42 is supported upon a resilient structure, represented here as spring 54 which serves to urge the carrier 42 to a rest position when the coil 48 is not energized. Providing a current to the coil would ideally displace the carrier 42, and hence the lens 40, by a distance from the rest position which was proportional to the current flowing in the coil. The lens assembly 40 is controlled to form an image at the surface of an image sensor 56. The voice coil motor and sensor combination may be contained in a housing 58.

Figure 5:
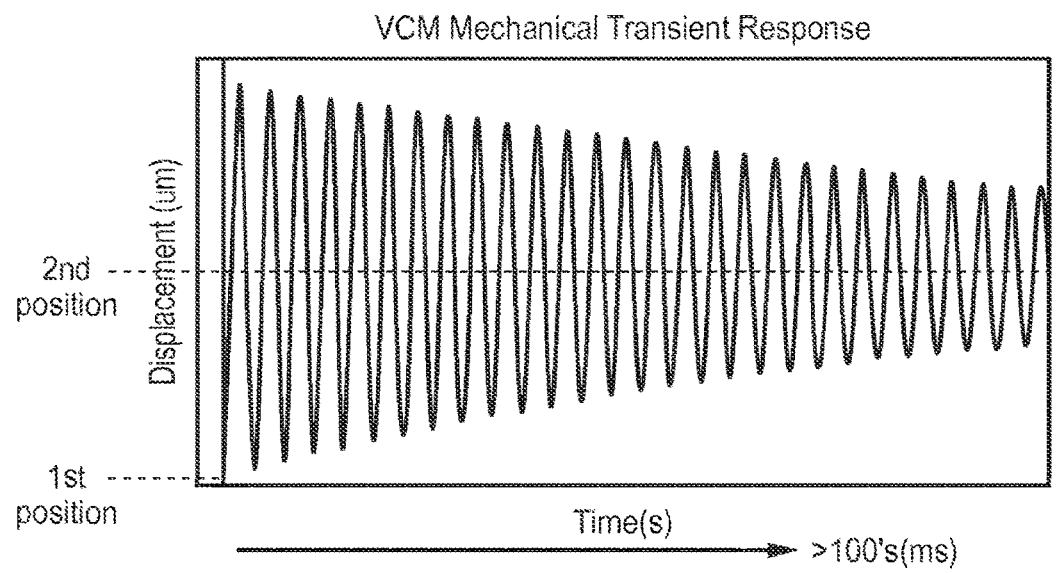
FIG. 5 schematically illustrates ringing which may be observed in a voice coil motor after demanding a step change of position.

In reality, the voice coil motor of FIG. 4 has some behaviors which are less than ideal for its desired use. The lens 40, carrier 42 and coil 48 by definition have mass. They are connected to a body of the voice coil motor by the spring like suspension 54. Thus we have a spring and mass combination which depending on the level of damping of the system, may undergo resonance. Some damping of the lens and carrier may be provided by air entrained between the lens and the image sensor or within a housing around the lens and sensor combination. Additionally some damping may result from inadvertent and indeed generally undesirable frictional contact between the lens carrier 42 and the magnetic yoke 46. For a given step change input current, an over damped system would theoretically never reach its desired position. Therefore the manufacturers of such voice coil motors make the motors less than critically damped, and indeed the inability to provide proper damping means that the voice coil motors often experience Q factors in the range of 10 to 20 although more modern actuators are beginning to show reduced Q factors. Thus, as schematically illustrated in FIG. 5, following a step command to move the lens from a first position to a second position, the lens may undergo oscillatory displacement around the second position, with the amplitude of the oscillations dying away over time. Such oscillatory behavior must be given time to die away to a sufficiently small value before the camera is usable.

Figure 6:
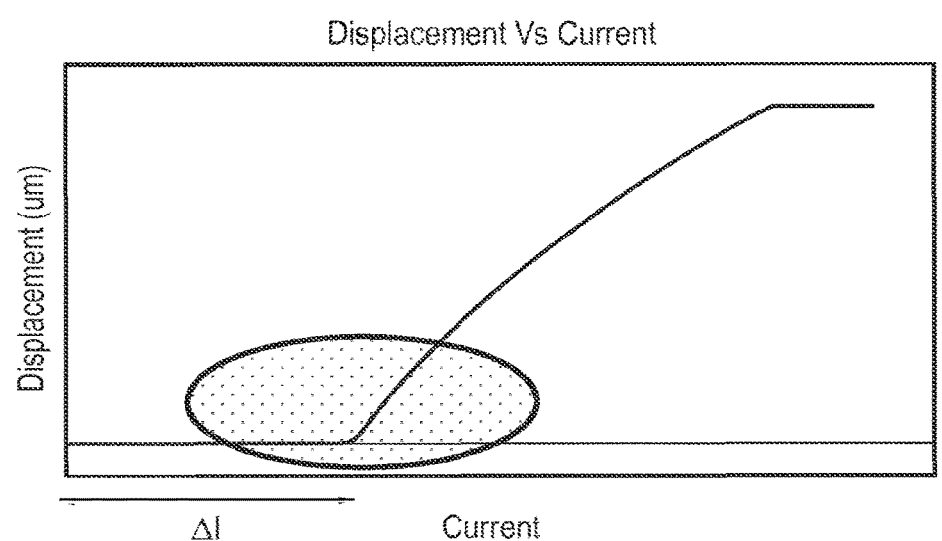
FIG. 6 schematically illustrates "stickiness" within a voice coil motor where a changing current does not lead to displacement of the lens until the current change exceeds a threshold.

Another feature of a real voice coil motor is illustrated in FIG. 6 and can be regarded as being "static friction", stickiness or spring preload. Thus, although in the ideal motor the displacement would be directionally proportional to current, real motors only start to move once the current value, or changes in the current value, exceeds a threshold value M. The threshold value can be a function of orientation of the voice coil motor and/or acceleration (for example if a camera is being used in an accelerating vehicle).

Figure 7:
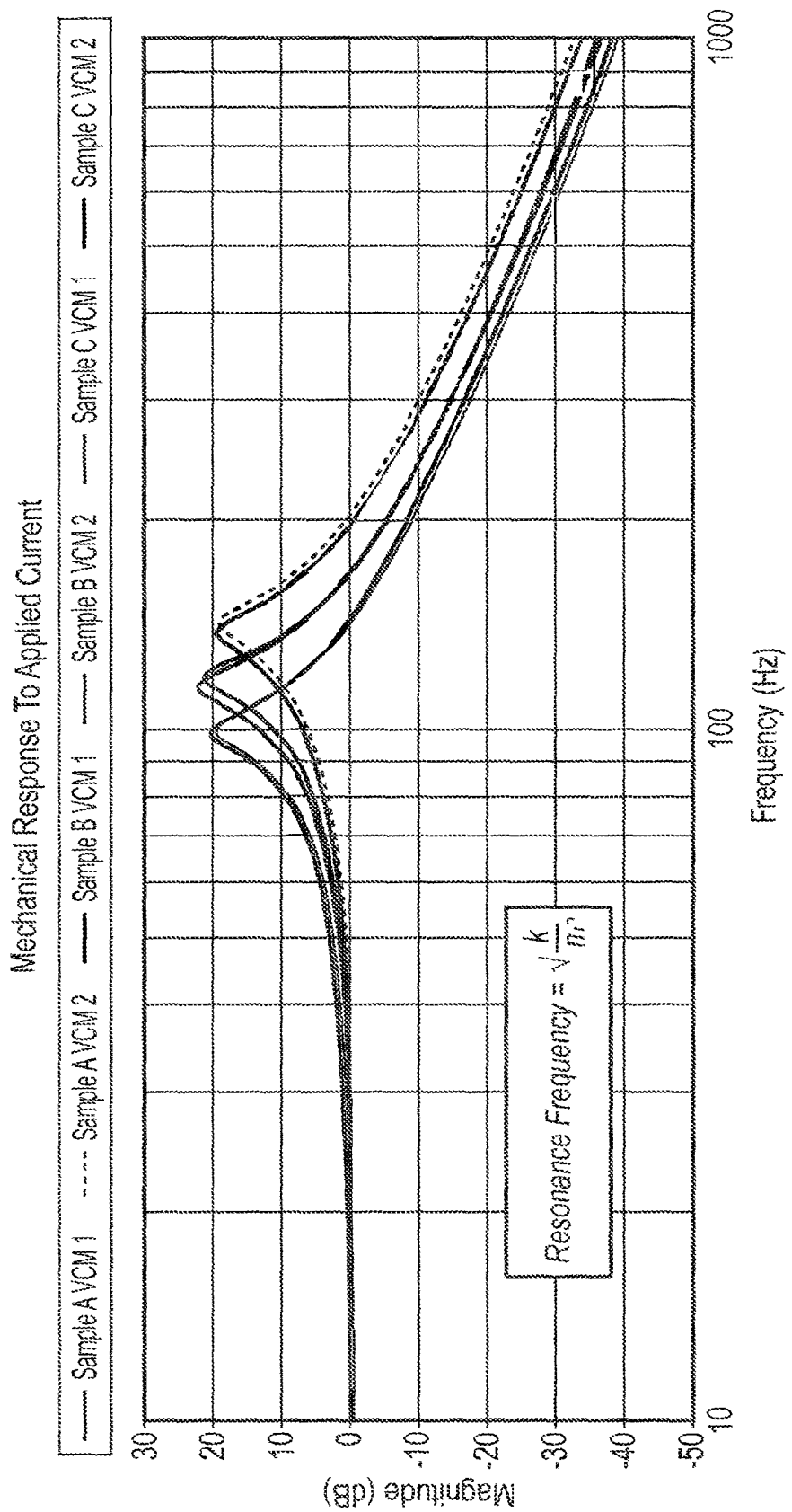
FIG. 7 is a plot of resonance frequencies for nominally identical voice coil motors selected out of differing manufacturing batches.

A problem with mass produced real world voice coil motors is that although they are supposedly nominally identical, manufacturing tolerance between batches may lead to relatively small but significant changes. FIG. 7 shows the frequency response of six actuators from three batches of the same actuator. Within each batch the particular actuators are generally well matched, but from batch to batch the resonant frequency can vary between approximately 98 Hz and approximately 105 Hz (in this example). Other VCMs may show reduced or larger ranges of variation. This variation can be significant when it comes to implementing rapid control strategies to move the voice coil motor from a first (or initial) position to a second (or final) position in, for example, an autofocus operation.

Analog Devices Inc. has proposed, in U.S. Pat. No. 8,299,744, a drive method which reduces the settling time of the motor driven system, such as the voice coil motor, described herein. The teachings of U.S. Pat. No. 8,299,744 are incorporated into this disclosure by reference. In broad terms, the step change drive signal is divided into a plurality of steps, such as two steps, three steps, four or five steps, where the relative step change (or step size) is selected so as to minimize the mechanical energy in the voice coil motor around the resonant frequency of the voice coil motor. FIG. 8a shows a drive signal where the current change required to move the voice coil motor from an initial position to a final position is normalized to a scale between zero and one. The resonant frequency of the voice coil motor is known, and the value '$t_u$' is equal to $½F_R$ where $F_R$ is the resonant frequency. In FIG. 8a, for a lightly damped system, the drive signal is split into two steps 80 and 90, in the first step 80, half of the drive signal is applied between the period zero and time $t_u$, and then the remainder 90 of the drive signal is applied from time $t_u$ onward. If this time domain response is considered in the frequency domain, then this is equivalent to putting a notch filter at the frequency $F_R$ of the voice coil motor/lens combination.

The approach shown in FIG. 8a would be quickest implementation disclosed in U.S. Pat. No. 8,228,017 to achieve open loop positioning of the voice coil motor. This technique works reasonably well as long as expected resonant frequency of the voice coil motor (and hence the ideal value of $t_u$) does not vary from the actual resonant frequency of the voice coil motor by more than 2 or 3%. This requirement is more stringent than the manufacturing variation from batch to batch of the same sensor as shown in FIG. 7. For this reason, other variants of the drive scheme are shown in FIG. 8b to FIG. 8d.

Figure 8:
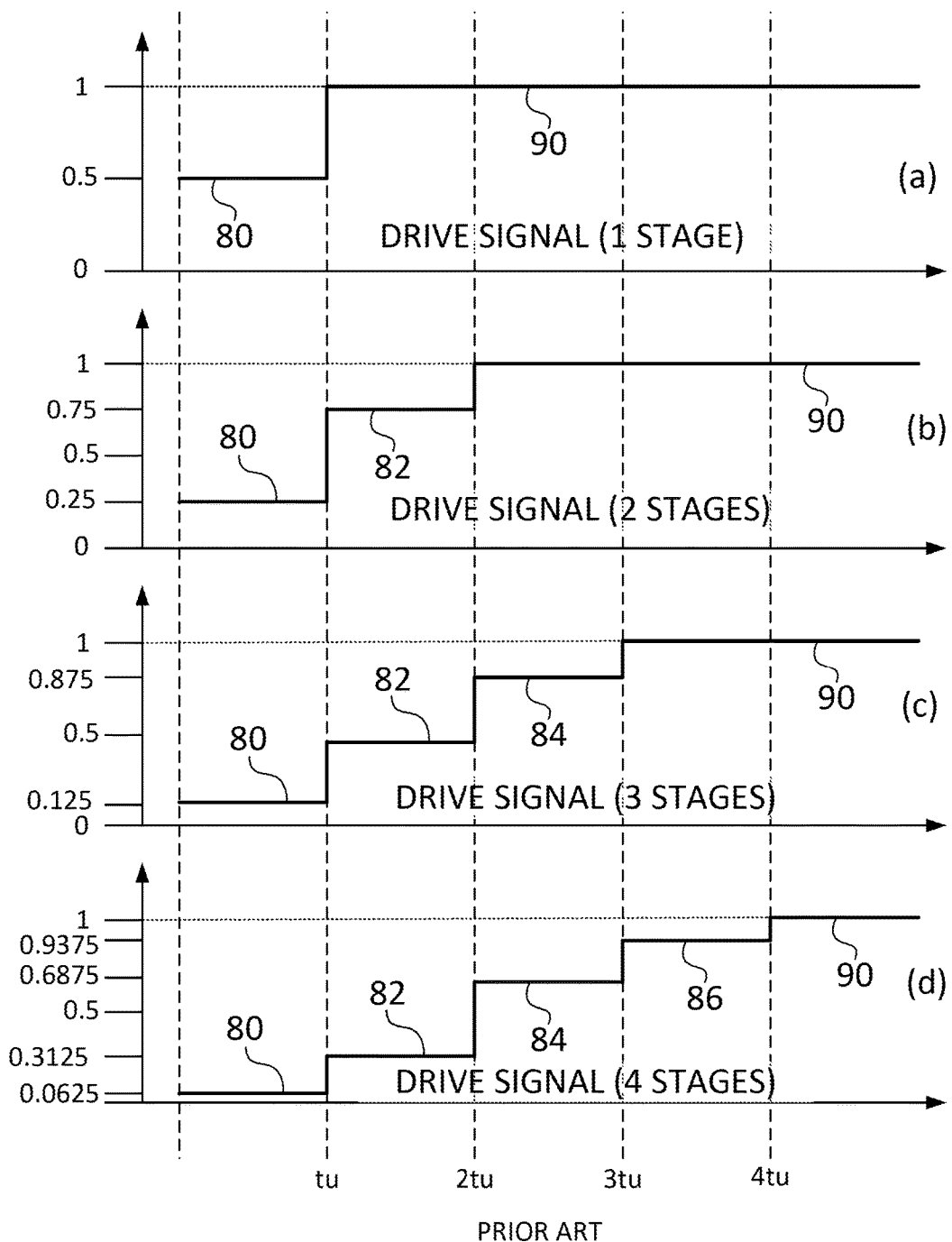
FIG. 8a to FIG. 8d shows a plurality of drive schemes as disclosed in U.S. Pat. No. 8,228,017.

FIG. 8b corresponds to a two stage notch filter, FIG. 8c corresponds to a three stage notch filter and FIG. 8d corresponds to a four stage notch filter. The notches can be placed close to one another but at slightly different frequencies so as to obtain a broader notch which should overlap the resonance peak in the real voice coil motor. However this tolerance to manufacturing variation does come at the cost of increased settling time. Thus the drive scheme shown in FIG. 8b has three steps 80, 82 and 90, where the signal asserted at time zero to a quarter of the step change value until period time $t_u$. Then it is changed to a value equivalent to three quarters of the step change value until the period of the time $2t_u$, and then the signal is asserted to its final value 90 from then on. Thus the settling time has been doubled. Similarly the settling time is further increased for the three and four stage versions described in U.S. Pat. No. 8,299,744. The relative values of the steps 80, 82, 84, 86, 90 with respect to one another can be formed from the rows of Pascal's triangle. Thus the step sizes for FIG. 8a correspond to step sizes of equal size, and hence can be obtained from the second row of Pascal's triangle where the steps therein have values "1, 1" and hence when this is normalized each step has a value of 0.5. The arrangement shown in FIG. 8b comes from a third row of Pascal's triangle where the relative values are "1, 2, 1", which when normalized will see transition size of a quarter, a half and a quarter between each of the steps. The arrangement shown in FIG. 8c comes from the fourth row of Pascal's triangle which have the values "1, 3, 3, 1" and when this is normalized gives rise to the step size of ⅛, ⅜, ⅜, ⅛ shown in FIG. 8c. The sequence can be extended. The two stage approach shown in FIG. 8 can cope with a resonance variation of approximately ±10%, whereas moving up to the four stage approach shown in FIG. 8d this can cope with the variation in the resonance frequency of ±25% from the nominal frequency.

Figure 9:
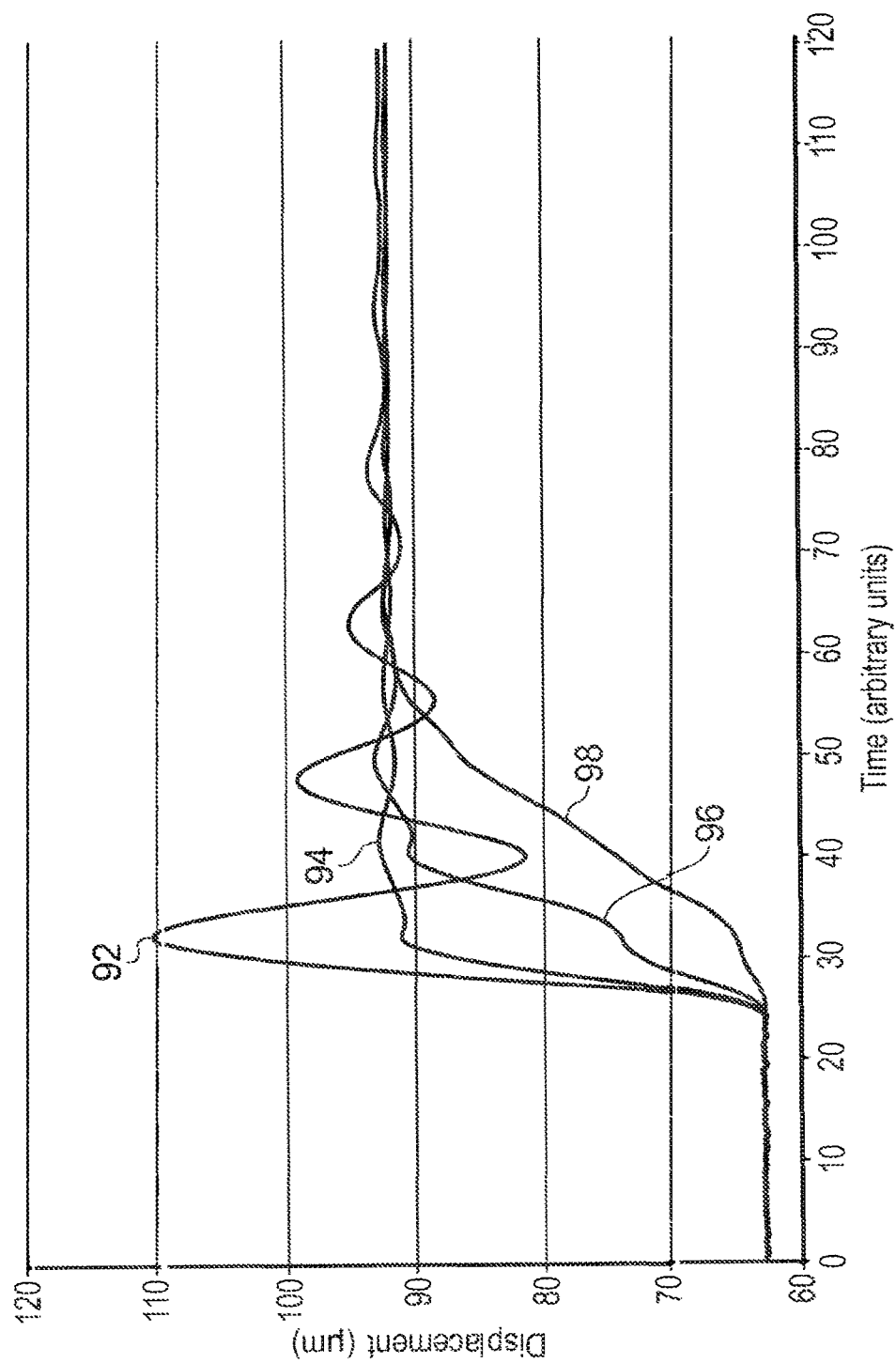
FIG. 9 illustrates response time for various drive schemes performed in accordance with the teachings of U.S. Pat. No. 8,228,017.

The response of a voice coil motor to the drive schemes of FIGS. 8a, 8b and 8d is shown in FIG. 9, alongside the response of just providing a single drive step.

Since only a comparison of the drive schemes is of interest, the time axis has been shown in arbitrary units. The undamped VCM response is shown as curve 92. The drive signal is supplied at time t=25 and the ringing response of the VCM is observable until t=100. If the two step scheme of FIG. 8a is used, then the VCM gets close to its final position by t=35 and any subsequent overshoot or ringing is much reduced. Using the three step scheme of FIG. 8b the VCM gets close to its final position by t=45 and thereafter exhibits similar overshoot and ringing performance. This is represented by curve 96.

Finally the five step scheme of FIG. 8d is represented by curve 98. Here the VCM gets close to its final position by t=60.

The intervals between the steps as well as the step sizes can be adjusted, as taught is U.S. Pat. No. 8,228,017. Using different (but predefined) time intervals for the drive signal update broadens the frequency notch in the frequency domain while changing the step size allows the system to perform better for VCMs with low Q factors.

The time advantages and performance advantages associated with the two step scheme shown in FIG. 8a make it desirable to use the scheme, but as noted, variation between components from batch to batch of nominally identical components is such that the change in resonant frequency makes using the scheme unrealistic without steps being taken to characterize the resonant frequency of the voice coil motor either prior to assembly into a product, in situ in the product, or in both cases. However further investigation by the inventors yielded an understanding that such voice coil motors exhibit further undesirable properties concerning their performance.

Figure 10:
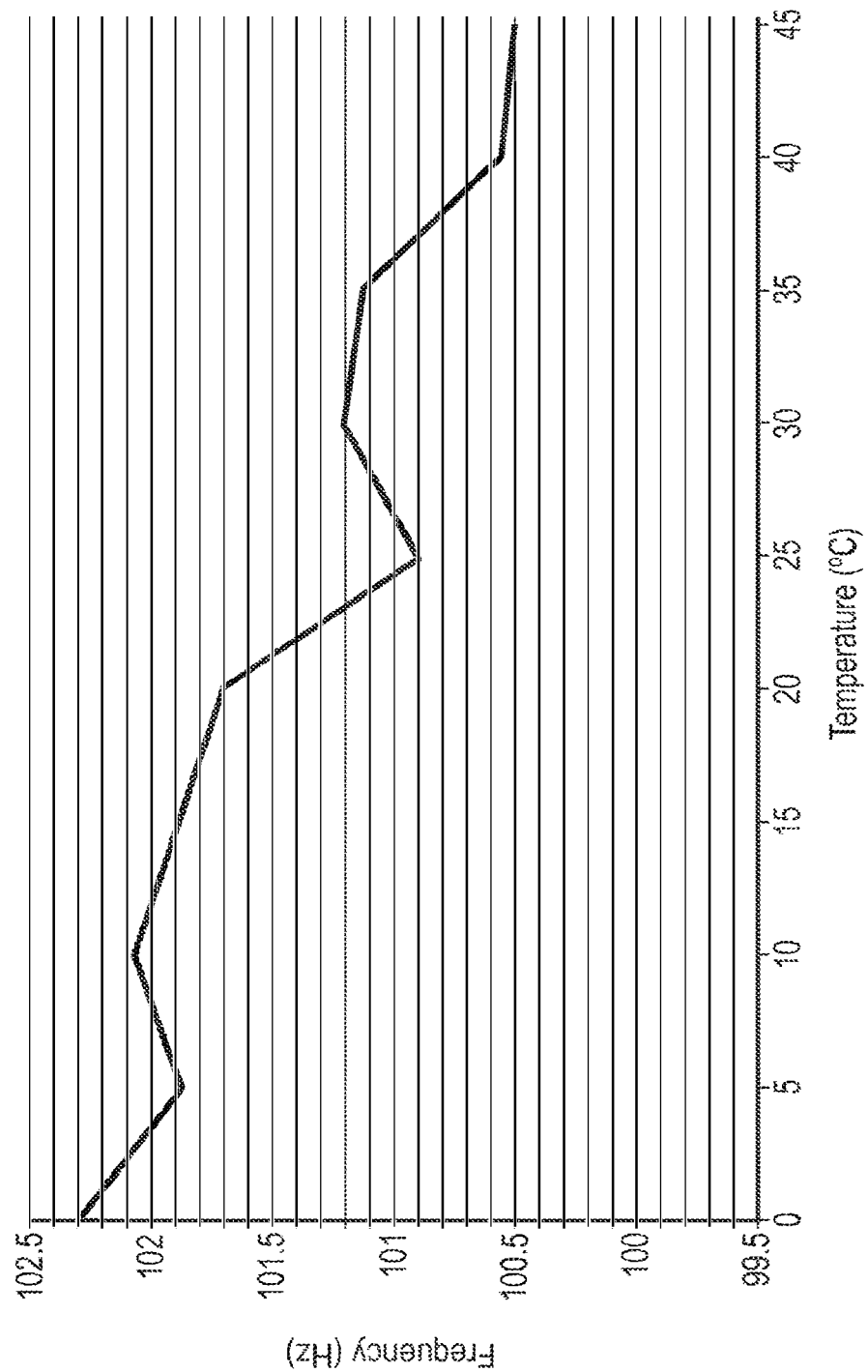
FIG. 10 is a plot of resonant frequency versus temperature for a voice coil motor held at a nominally constant displacement.

An investigation was made concerning the variation of resonant frequency of a voice coil motor with respect to temperature. For the purposes of this investigation, the nominal position of the coil was held constant. FIG. 10 shows data from one of the experiments indicating a frequency change of about 2 Hz over a temperature range of 45° C. This change might be tolerable for domestic equipment, but for equipment rated to operate over an extended temperature range then the change in frequency might prove to be significant and more particularly start to hit the approximate 3% limits for the quickest motor drive and focusing scheme. Other actuators may show bigger temperature variations.

Figure 11:
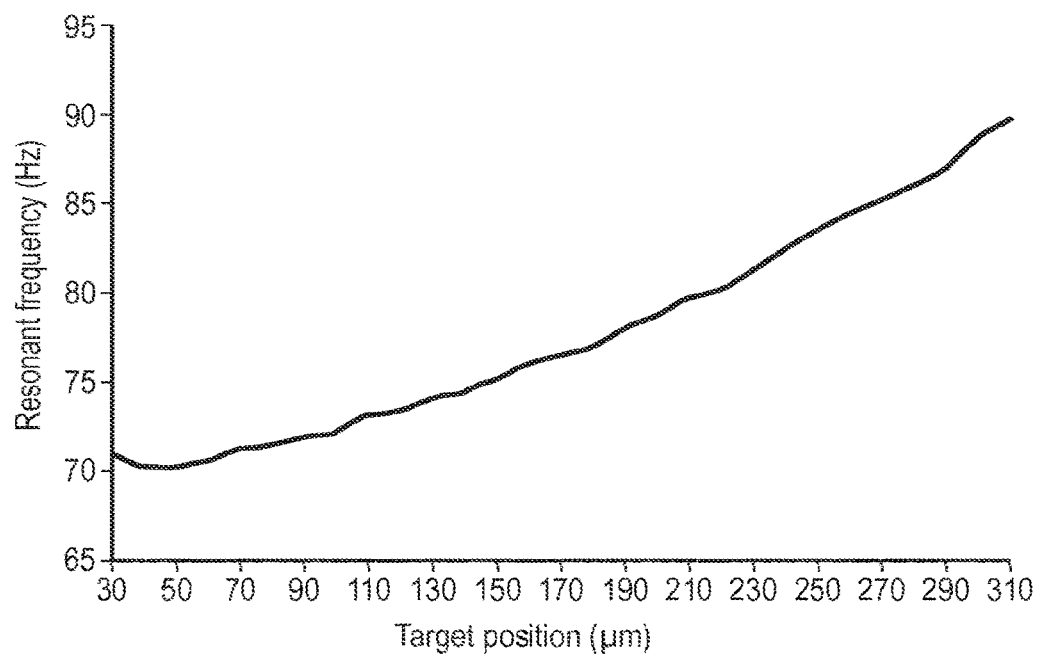
FIG. 11 is a graph showing the variation in resonant frequency against target lens position for a voice coil motor controlled lens.

Of greater significance, and more of a surprise, was the fact that the resonant frequency can change significantly with respect to the demanded (final) position of the voice coil motor. FIG. 11 shows a plot of resonant frequency versus target position for another voice coil motor. The target position was moved between 30 and 310 microns from the nominal rest position by various amounts. It can be seen that the resonant frequency for this voice coil motor varies between approximately 70 Hz and approximately 87 Hz as the target position varies between 30 and 310 microns. This variation on its own is sufficiently large to preclude use of the fastest settling scheme, and of course target related variation, batch to batch variations and temperature related variations can act concurrently, either additively or destructively. An investigation was also made as to how much the resonant frequency might change with orientation of the voice coil motor. However the variation was found to be in the range of about 1 Hz or so and hence is less significant than the temperature, batch or target related variations.

Figure 12:
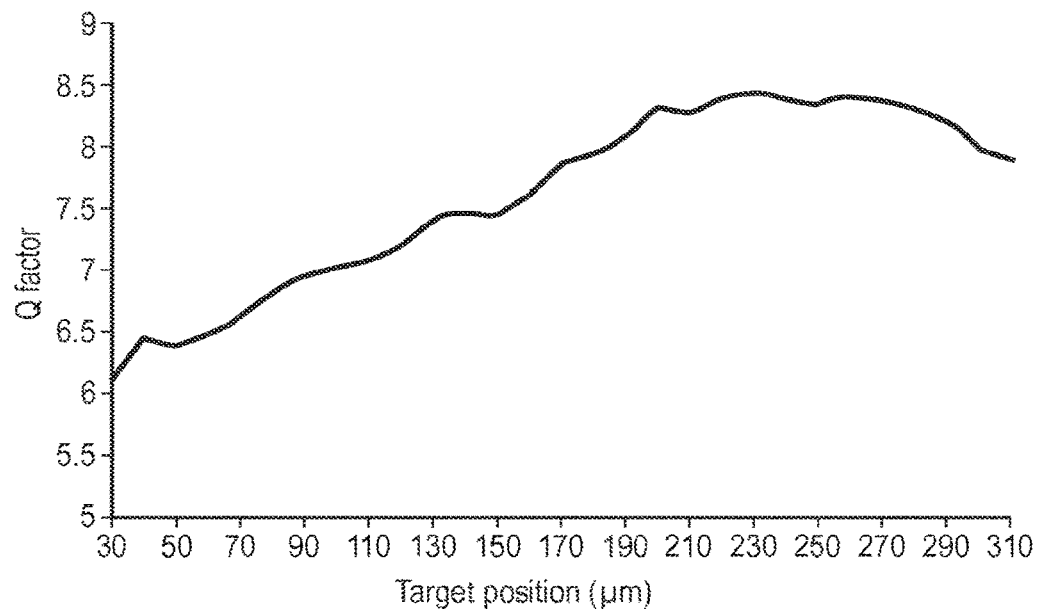
FIG. 12 is a graph showing Q factor versus target position for a voice coil motor.

A further investigation was made to characterize the quality factor as to function of target position and this is illustrated in FIG. 12. The quality factor varied between about 6 and 8.5 for the device under test depending on the target position. The consequences of this will be discussed later.

Thus, investigations have shown that the resonant frequency can vary as a function of final position and temperature. One might also suspect that non-linear effects in the spring may cause the resonant frequency to vary with device orientation. It will also be shown later that orientation has a strong effect on the amount of drive current required to reach a desired position.

Figure 13:
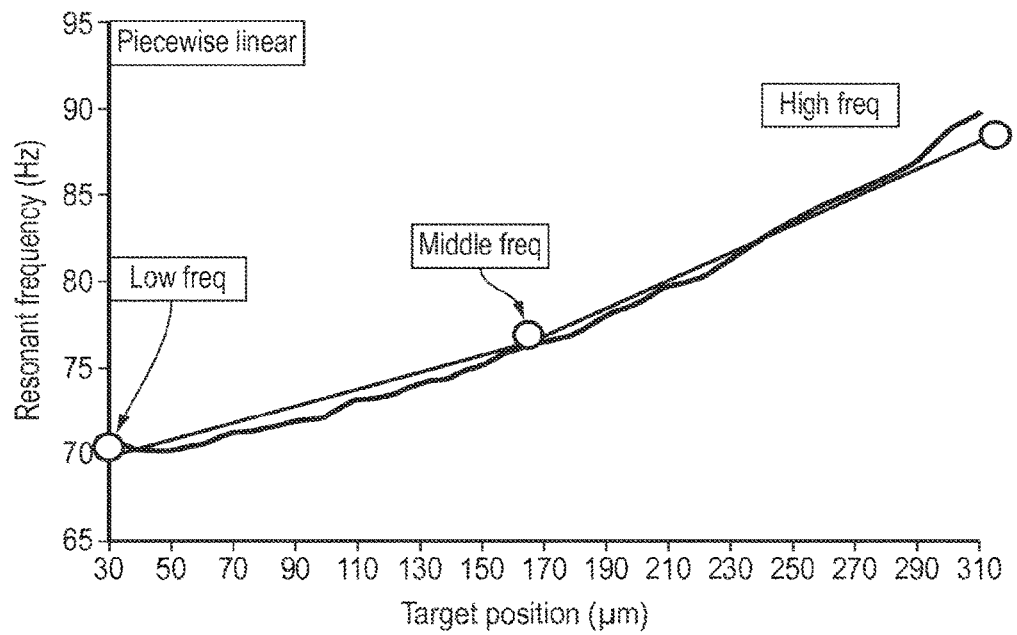
FIG. 13 shows a piece wise linear approximation of a resonance frequency versus target position which may be used to modify the drive signal update rate in accordance with the teachings of this disclosure.
Figure 14:
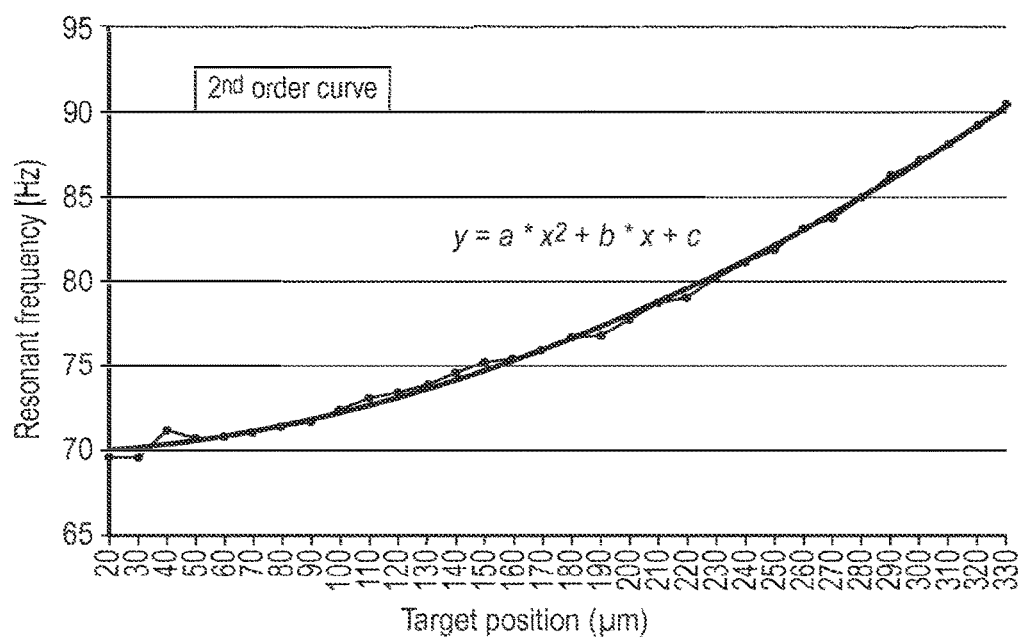
FIG. 14 shows a second order approximation fitting resonant frequency to target position and which may be used to modify the update rate of the drive signal in accordance with the teachings of this disclosure.

As noted before, the control scheme in which only two steps are provided works well provided that the update period $t_u$ is within 2 to 3% of the half cycle time of the resonance of the voice coil motor. This variation in $t_u$ was found to be consistent (for a given actuator) and hence it becomes feasible to characterize the resonant frequency of each voice coil motor as a function of parameters such as one or more of position, temperature and orientation and load that into non-volatile storage or to parameterize it and load the result into non-volatile storage such that the time period between step transitions can be varied as a function of the resonant frequency of the voice coil motor when undergoing a transition between first and second values, and that the update frequency $t_u$ may be modified as a function of the first value, the second value or a combination of the first and second values. In practice, acceptable results have been achieved by modifying the step size update period based on the resonant frequency at the second (final) position. FIG. 13 schematically illustrates data in which measured resonant frequencies as a function of target position have been acquired, and the resonant frequency as a function of target position has approximated by two piece wise linear trajectories being approximated between target positions corresponding to 30 and 170 microns, and 170 to 310 microns. A linear interpolation can be performed between these data points to estimate the resonant frequency with sufficient accuracy for the fastest scheme (referred to as ARC 0.5) to be used. As an alternative to linear interpolation, where target position and resonant frequency may be stored in memory, for example in the look up table, a parameterized curve may be formed and stored in memory, such as a resonance frequency can be calculated based on the desired target position. An example of a second order curve based on measured data is shown in FIG. 14.

Similarly interpolations based on temperature and/or orientation may be performed and the individual corrections combined for an updated estimate of the resonant frequency.

The update period $t_u$ is inversely related to the resonant frequency, so it may be implementationally more efficient to store the update period as a function of input code in memory. Thus a timer can be used to count to the update period value and then supply the next step value in the step sequence.

An assumed maximum resonant frequency, and hence minimum transition time, can be set as a system constant and variations (additions) to the update time as a function of target code C can be held in memory. This is a particularly compact way of storing data as a look up table.

It is thus possible to provide a control method and system for a motor driven actuator where two to step the control strategy illustrated in FIG. 8a can be used.

The manufacturing overhead of characterizing the resonant frequency at actuator manufacture or during manufacture of the target device is not too onerous. Nevertheless, it can be avoided by in situ characterization. In situ characterization may also have the advantage that the device can be re-characterized if the operating conditions, for example temperature, around the device fall outside of its nominal operating conditions, if the device has aged, or if it has been subject to a potentially damaging impact.

The voltage across the voice coil and the current flowing through the voice coil can be measured, for example by analog to digital converters within the motor driver or as other components provided within the finished system. From this it becomes possible to characterize the impedance of the voice coil motor (or the back EMF) as a function of an AC drive signal supplied to it and/or by measuring the residual back EMF oscillation after applying a step signal, and also as a function of a DC by a signal which controls the position of the voice coil. It is known that the impedance (and back EMF) of the motor changes significantly as the voice coil motor approaches resonance, and hence these characteristics can be relatively easily examined to spot the peaks in the impedance, both as a function of frequency and a function of position in order to characterize the resonant frequency of a voice coil motor in situ. These in situ characterizations may be used to replace a pre-existing characterization, or may be used to modify the pre-existing characterization slightly. This latter approach stops any measurement errors preventing the system from working, whilst it should allow the system to slowly adapt at each re-characterization to its prevailing operating performance. The characterization can be performed periodically when the camera or actuator is not being used for its primary purpose. Thus, for a camera provided in a mobile phone or tablet where battery power is at a premium, calibration might only be performed infrequently and when the device is charging. However it may also be performed if an accelerometer detects a potentially damaging impact event.

As noted earlier, the Q factor of the voice coil motor can also change as a function of position. The step sizes which had previously been calculated in accordance with Pascal's triangle, may be modified as a function of Q so as to increase the step size of steps earlier in the code sequence at the expense of steps later in the code sequence. Thus, for a two step sequence, then has the Q factor reduces the first step is made slightly larger than the second step. Thus the individual steps may be varied by fixed amount, by adding +NLSB to the first step and subtracting −NLSB from the second step where N varies as a function of the second position. It may be a low number, for example 1 or 2 LSB, or it may be calculated as a percentage of the step size between the first and second positions. In one embodiment the Q factor correction may be achieved by dividing the code range into just two regions, whereas in other embodiments the code range may be divided into three or more regions or a substantially linear or other approximation may be used to modify the step size as a function of target code position to take account of variations in Q factor. The Q factor may also be determined by in situ analysis.

| Q | 40 | 20 | 15 | 10 | 5 |
|---|----|----|----|----|---|
| Percentage in first step for ARC0.5 | 51% | 52% | 53% | 54% | 58% |

The voice coil motor also demonstrates orientation dependent behavior. In fact experiments have shown that the spring pre-stress of the voice coil motor exhibits an orientation related response.

Figure 15:
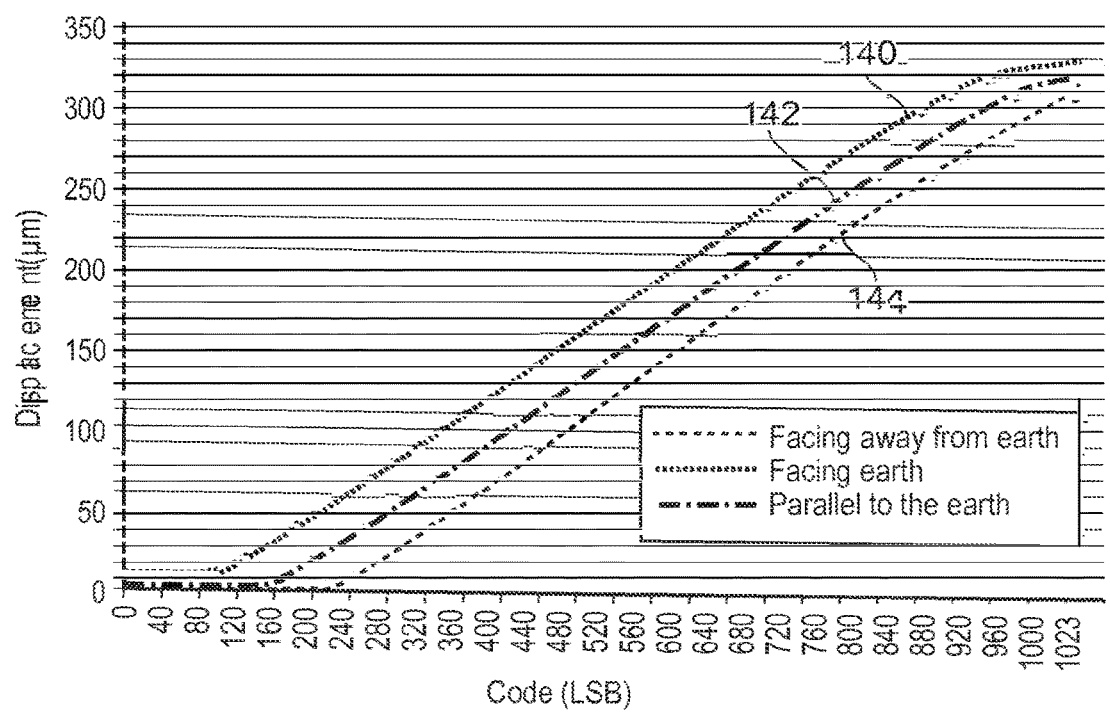
FIG. 15 is a graph showing displacement of a voice coil motor versus a driving code signal for a plurality of orientations of the voice coil motor within a gravitational field.

FIG. 15 shows a plot of displacement versus code for a first voice coil motor where the motor was orientated to look downward, as represented by curve 140, horizontally, as represented by curve 142, or upwardly as represented by curve 144.

The graph shows that the voice coil motor always had some "stickiness" possibly from spring pre-stress such in that a code charge of a few LSB did not cause the motor to move. The code change ΔC required to overcome the stickiness varied with orientation, being in this example 90 LSB when the VCM and lens were looking downwardly, 160 LSB when horizontal and 230 LSB when looking upwardly.

Once the lens and VCM are moving, the transfer function gain (displacement versus code change) are substantially constant. The final position also exhibited some orientation dependent behavior.

Figure 16:
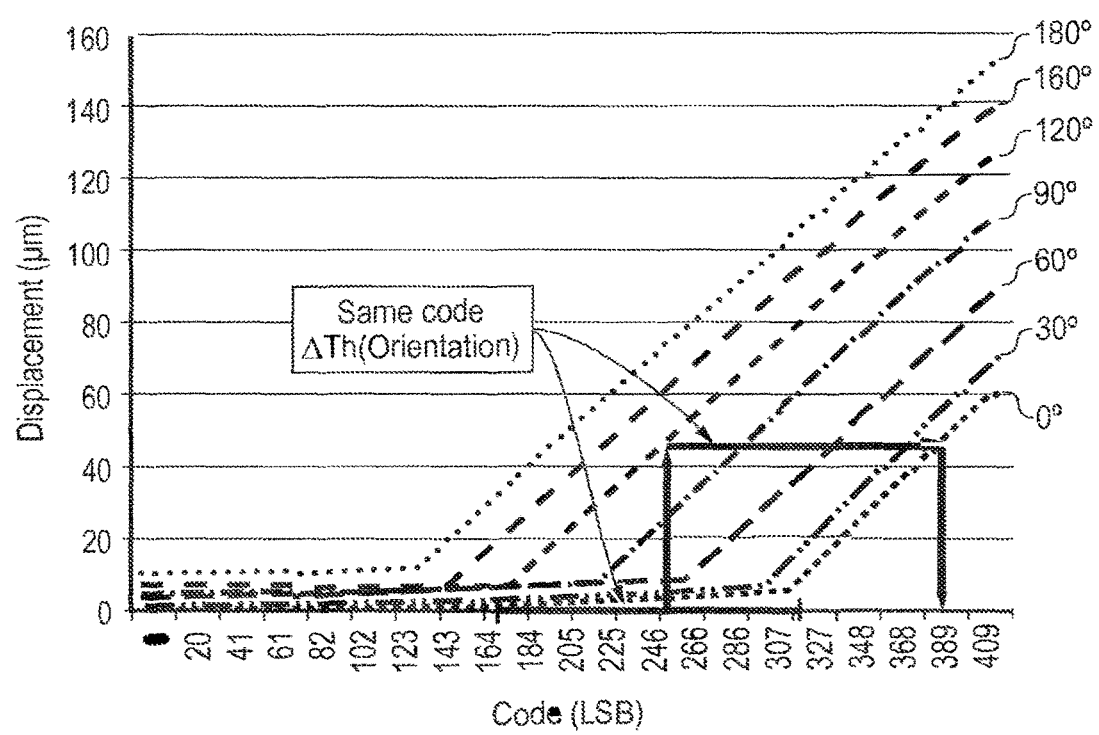
FIG. 16 graphically illustrates how code correction may be made based on voice coil motor orientation to achieve a desired response.

FIG. 16 shows how orientation data may be used to modify the magnitude of the drive scheme. Here 0° corresponds to looking vertically upward and 180° corresponds to looking vertically downward. Thus, as might be expected an instruction to move the lens away from the image sensor results in greater displacement when the force of gravity on the lens acts in the same direction as the motor force, compared to when gravity opposes the motor force.

Drive codes may be specified for a particular orientation. For the purpose of this discussion assume that the displacement versus code characteristic is stored for 0°. If we want a displacement of 44 μm then at 0° the code change is about 375. But if the control scheme has access to orientation data, for example from accelerometers, and this indicates that the camera is inclined at 120° then a code change correction can be estimated based on the orientation data.

The code correction can be used in several ways.

The most obvious way is to modify the target code value. Thus in this example the change in code may be modified from 375 to 246. The step sizes in the drive scheme would then be accordingly scaled.

Less apparent, is that this can also be used to look up the correct resonance frequency values. Thus, if during autofocus the autofocus controller determines for its present orientation that a code change of 250 LSB is appropriate, then this can be used (again for the angle of 120°) to determine what the code change at 0° would be and if this is the angle where the resonant frequency data was collected, then the resonant frequency corresponding to the corrected code (375 in this example) should be used to set the code update period $t_u(c)$.

Figure 17:
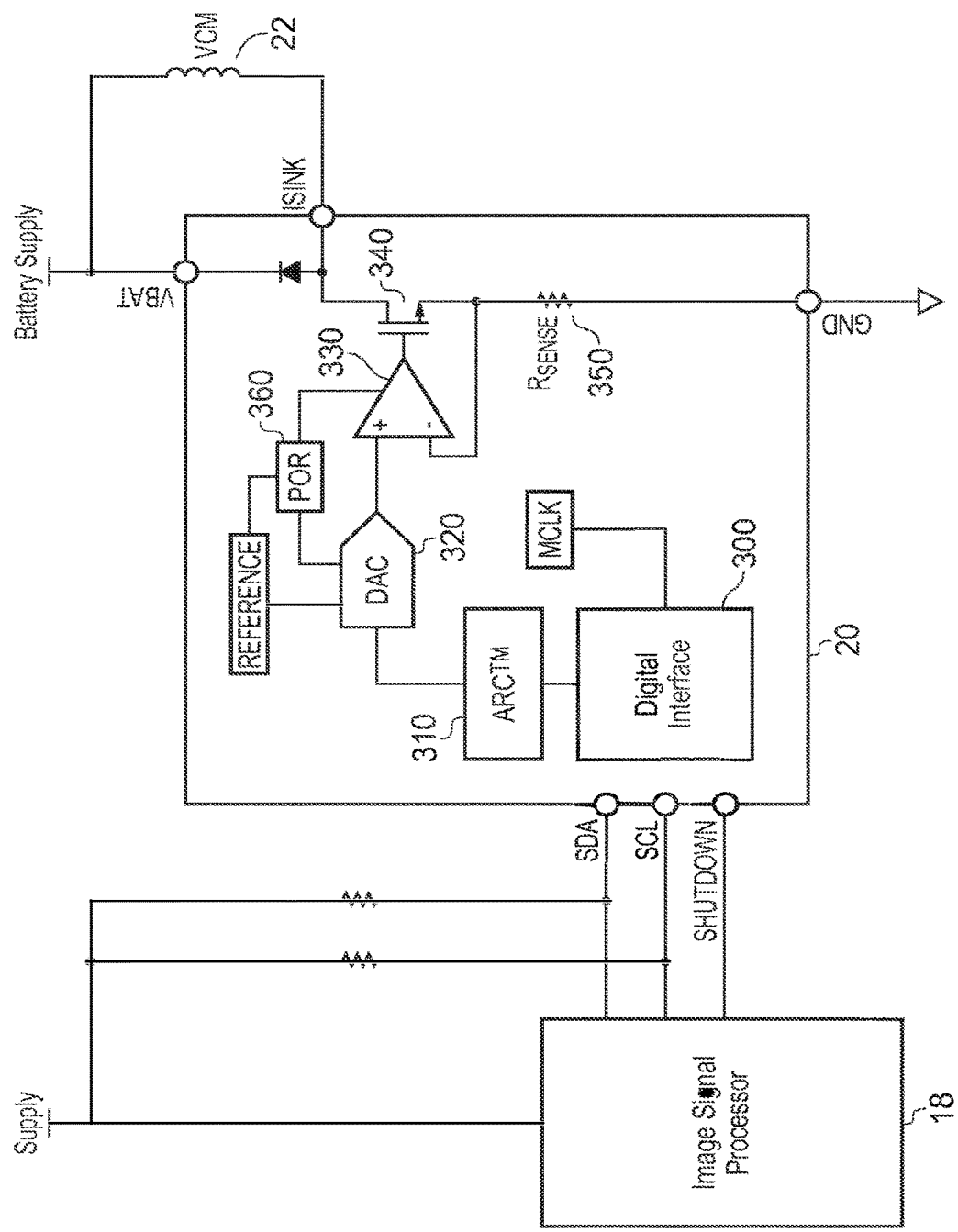
FIG. 17 illustrates voice coil motor lens controller in accordance with the teachings of this disclosure.

FIG. 17 shows an embodiment of a drive circuit for implementing the method described herein.

The motor drive 20 has a digital interference 300 to receive focus/lens position commands from the image signal processor 18. The demanded lens positions are supplied to an actuator ringing controller 310 implementing the step size control and update timings taught by this disclosure.

The actuator ringing controller outputs digital words, at appropriate update times, to a digital to analog converter 320. A voltage output from the ADC is converted into a drive current by a transconductance circuit formed by operational amplifier 330, transistor 340 and current measuring resistor 350.

Internal voltage reference and power up reset components 360 are provided.

Figure 18:
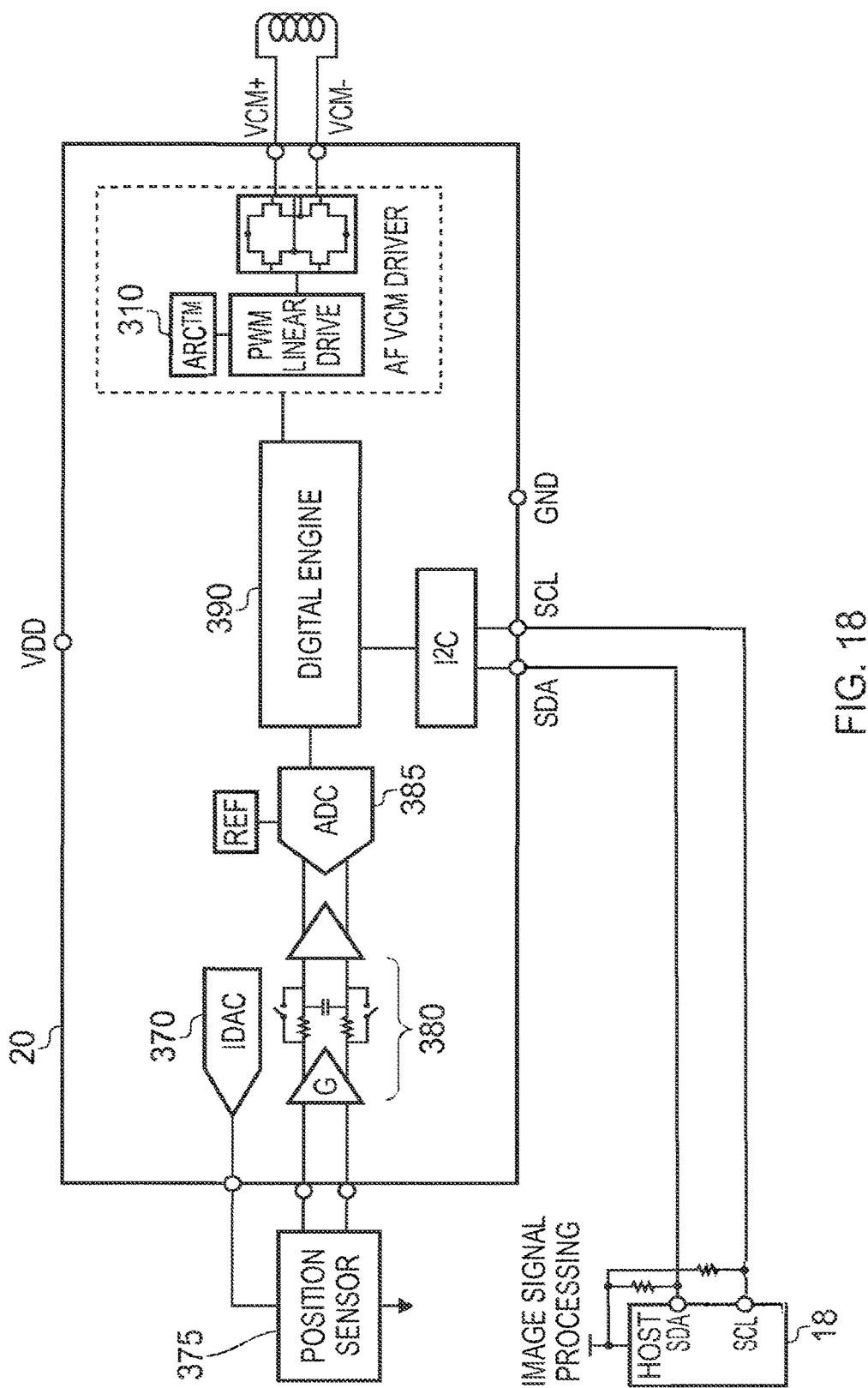
FIG. 18 illustrates a second voice coil motor controller in accordance with the teachings of this disclosure.

FIG. 18 shows a modification to FIG. 17 where a DAC 370 is provided to provide a control signal (such as a controlled current) to a position sensor 375, and a signal from the position sensor 375 is gained by an amplifier 380 and digitized by an analog to digital converter 385, such that orientation data can be provided to a digital engine 390 (the digital engine 390 may incorporate the digital interface 300 of FIG. 17) in conjunction with lens control signals from an image processing system performing optically based autofocus operations.

Figure 19:
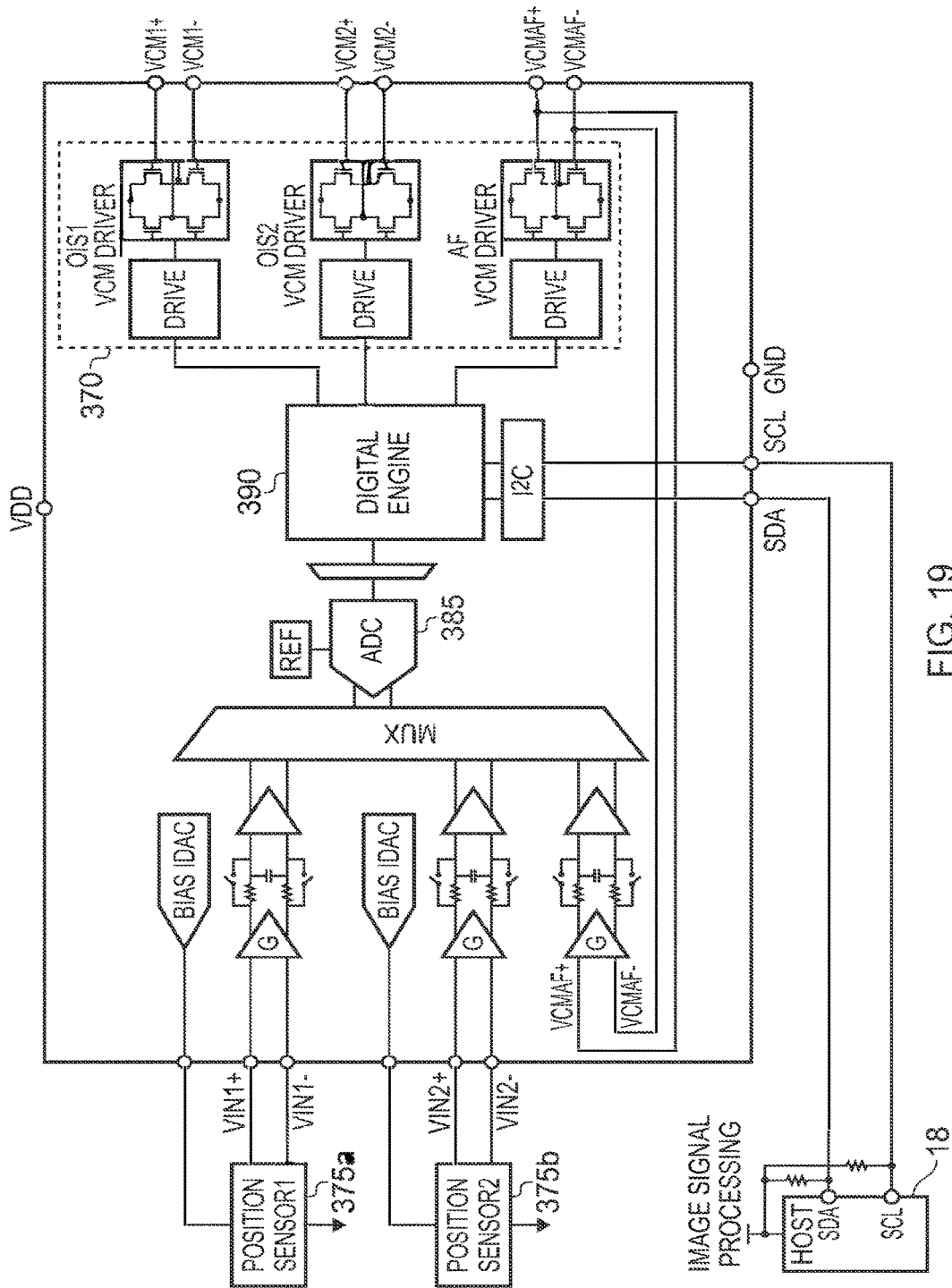
FIG. 19 illustrates a further VCM controller for implementing the teachings of this disclosure.

The orientation data may also be used in an optical image stabilization system where VCMs are provided for image stabilization. Such a system is shown in FIG. 19, where multiple orientation/position sensors 375a, 375b are provided, and multiple VCMs can be driven from a multichannel driver 370. The systems shown in FIGS. 18 and 19 may also be driven to perform in situ calibration based on back EMF and/or positional feedback from other sensors. Such recalibration may be under the control of software executing on a further processor (as may be found in a tablet or smartphone) or executed by the digital engine.

It is thus possible to be able to use a two step actuator ranging control scheme even with actuators whose resonant frequency varies by more than a couple of percent.

The claims have been presented in single dependency format so as not to incur excessive claims fees at the USPTO. However it is to be understood that any claim may be dependent of any preceding claim of the same type except where that is clearly technically infeasible.

The invention claimed is:

1. A method of driving a motor driven mechanical system from a first position to a second position, the method comprising:
   i) calculating a change in a drive signal to move the motor driven mechanical system from the first position to the second position;
   ii) dividing the change in the drive signal into a plurality of drive steps so as to form at least a first intermediate drive signal value and a final drive signal value;
   iii) applying, to a motor of the motor driven mechanical system, the first intermediate drive signal value for a time $t_u$, and then applying the final drive signal value;
   further comprising:

inspecting data relating to a measured resonance frequency or a parameter based thereon at the second position, and using the measured resonance frequency or the parameter based thereon to set the time $t_u$.

2. A method as claimed in claim 1, wherein the time $t_u$ is inversely proportional to $F_R(c)$ where $F_R(c)$ is an estimated resonance frequency for a demanded second position represented by an input value C.

3. A method as claimed in claim 1, in which the data comprises a data table listing the resonance frequency or a parameter based thereon versus a position code (c) for a plurality of second positions.

4. A method as claimed in claim 1, in which the data comprises a parameterized response of the resonance frequency or the parameter based thereon.

5. A method as claimed in claim 1, in which the parameter is a time offset or clock offset to be added to a base time value or a base clock count.

6. A method as claimed in claim 1, in which the data is captured during a manufacturing based calibration step.

7. A method as claimed in claim 1, in which the data is captured during an in-situ calibration step.

8. A method as claimed in claim 1, comprising obtaining orientation data for the mechanical system, and modifying at least the first intermediate drive signal value based on the orientation data.

9. A method as claimed in claim 8, in which the first intermediate drive signal value is modified to account for an orientation induced current change required to cause the mechanical system to move.

10. A method as claimed in claim 1, in which the first intermediate drive signal value is modified to take account of a Q factor of the mechanical system at the second position.

11. A method as claimed in claim 10, in which the magnitude of a step size to reach the first intermediate value is increased as the Q factor decreases.

12. A method as claimed in claim 1, comprising acquiring temperature data and varying $t_u$ as a function of the temperature data.

13. A method as claimed in claim 1, comprising acquiring actuator orientation and varying the time $t_u$ as a function of orientation.

* * * * *